US012626638B2

(12) United States Patent
Li et al.

(10) Patent No.:  US 12,626,638 B2
(45) Date of Patent:      May 12, 2026

(54) DISPLAY PANEL AND DISPLAY APPARATUS

(71) Applicant: Hefei Visionox Technology Co., Ltd., Hefei (CN)

(72) Inventors: Shao Li, Hefei (CN); Dandan Sun, Hefei (CN); Ruiqiong Mei, Hefei (CN); Weishuai Zhang, Hefei (CN)

(73) Assignee: Hefei Visionox Technology Co., Ltd., Hefei (CN)

( * ) Notice: Subject to any disclaimer, the term of this patent is extended or adjusted under 35 U.S.C. 154(b) by 87 days.

(21) Appl. No.: 18/498,434

(22) Filed: Oct. 31, 2023

(65) Prior Publication Data

US 2024/0062715 A1      Feb. 22, 2024

Related U.S. Application Data

(63) Continuation of application No. PCT/CN2022/120643, filed on Sep. 22, 2022.

(30) Foreign Application Priority Data

Dec. 16, 2021    (CN) .......................... 202111544912.1

(51) Int. Cl.
*G06F 3/041*        (2006.01)
*G09G 3/32*         (2016.01)

(52) U.S. Cl.
CPC ............. *G09G 3/32* (2013.01); *G06F 3/0412* (2013.01)

(58) Field of Classification Search
CPC ...................................................... G06F 3/0412
See application file for complete search history.

(56) References Cited

U.S. PATENT DOCUMENTS 10,474,279 B2    11/2019  Hwang et al.
10,768,733 B2     9/2020  Kang et al.
(Continued)

FOREIGN PATENT DOCUMENTS

CN        101783360 A      7/2010
CN        104765181 A      7/2015
(Continued)

OTHER PUBLICATIONS

Chinese Office Action issued Dec. 14, 2022, in Chinese Application No. 202111544912.1, 10 pages (partial English translation provided).

(Continued)

*Primary Examiner* — William Boddie
*Assistant Examiner* — Alecia D English
(74) *Attorney, Agent, or Firm* — Maier & Maier, PLLC

(57)                ABSTRACT

A display panel and a display apparatus. The display panel includes: a light-emitting device layer including a base plate and a light-emitting layer arranged in stack; a touch control layer including touch control electrodes and a planarization layer covering the touch control electrodes; a buffer layer arranged at a side of the planarization layer away from the light-emitting device layer; an optical film layer arranged at a side of the buffer layer away from the touch control layer and including a plurality of black matrices and a plurality of light filtering units arranged in the same layer as the black matrices; a material of the buffer layer and a material of the planarization layer are immiscible, and an orthographic projection of the buffer layer on the base plate covers an orthographic projection of the light filtering units on the base plate.

17 Claims, 4 Drawing Sheets

(56) References Cited

U.S. PATENT DOCUMENTS

| | | | |
|---|---|---|---|
| 2013/0127747 A1* | 5/2013 | Ding | G06F 3/04164 345/173 |
| 2018/0188579 A1* | 7/2018 | Jeong | G02F 1/133345 |
| 2019/0146622 A1* | 5/2019 | Kang | H10K 59/40 345/173 |
| 2019/0181385 A1 | 6/2019 | Seong et al. | |

FOREIGN PATENT DOCUMENTS

| | | |
|---|---|---|
| CN | 104795430 A | 7/2015 |
| CN | 106803512 A | 6/2017 |
| CN | 110034158 A | 7/2019 |
| CN | 107852787 B | 4/2021 |
| CN | 112667100 A | 4/2021 |
| CN | 112670323 A | 4/2021 |
| CN | 113013221 A | 6/2021 |
| CN | 114284320 A | 4/2022 |
| CN | 112670323 B | 12/2022 |
| JP | 2010170988 A | 8/2010 |
| JP | 2012220670 A | 11/2012 |
| JP | 2013015703 A | 1/2013 |
| JP | 2019082685 A | 5/2019 |
| JP | 2019087267 A | 6/2019 |
| KR | 1020190071645 A | 6/2019 |

OTHER PUBLICATIONS

Chinese Office Action issued Apr. 6, 2023, in Chinese Application No. 202111544912.1, 8 pages (partial English translation provided).

Rejection Decision issued Jun. 17, 2023, in corresponding Chinese Application No. 202111544912.1, 6 pages (partial English translation provided).

International Search Report issued Nov. 28, 2022, in corresponding International Application No. PCT/CN2022/120643, 6 pages.

Extended Search Report issued on Feb. 27, 2025, in corresponding European Application No. 22905992.8, 11 pages.

Office Action issued on Oct. 8, 2024, in corresponding Japanese Application No. 2023-566961, 6 pages.

Office Action issued on Apr. 19, 2025, in corresponding Korean Application No. 10-2023-7037087, 14 pages.

* cited by examiner

DISPLAY PANEL AND DISPLAY APPARATUS

CROSS REFERENCE TO RELATED APPLICATION

The present application is a continuation of International Application No. PCT/CN2022/120643 filed on Sep. 22, 2022, which claims priority to Chinese Patent Application No. 202111544912.1 filed on Dec. 16, 2021, both of which are incorporated herein by reference in their entireties.

TECHNICAL FIELD

The present application relates to the field of display technology, and particularly, to a display panel and a display apparatus.

BACKGROUND

Currently, in order to remove the polaroid, a color film layer is generally utilized to replace the polarizer, therefore the thickness of the display panel is reduced by more than 100 um, the brightness is increased by 20%, and the utmost bending radius of the flexible screen is effectively reduced. However, the utilization of the color film layer to replace the polarizer has inherent defects. Since the color film layer is directly manufactured on the touch control layer, the matching of the current materials is not good, the color film layer and the touch control layer are miscible, the removed portions of the patterned color film layer will be left on the touch control layer, and the light-emitting efficiency of the display panel is affected.

SUMMARY

Embodiments of the present application provide a display panel and a display apparatus, in which the display panel can satisfy the display requirement and effectively reduce the residue of the portions of the color film layer to be removed on the touch control layer, the light-emitting efficiency of the display panel is ensured.

In one aspect, the embodiments of the present application provide a display panel, including: a light-emitting device layer including a base plate and a light-emitting layer arranged in stack, the light-emitting layer including a plurality of sub-pixel units distributed in an array; a touch control layer arranged at a side of the light-emitting layer away from the base plate and including one or more touch control electrodes and a planarization layer covering the touch control electrodes; a buffer layer arranged at a side of the planarization layer away from the light-emitting device layer; and an optical film layer arranged at a side of the buffer layer away from the touch control layer and including a plurality of black matrices and a plurality of light filtering units arranged in the same layer as the black matrices, the plurality of light filtering units being arranged in one-to-one correspondence with the plurality of sub-pixel units; in which a material of the buffer layer and a material of the planarization layer are immiscible, and an orthographic projection of the buffer layer on the base plate covers an orthographic projection of the light filtering units on the base plate.

In another aspect, the embodiments of the present application provide a display apparatus including the display panel as described above.

According to the display panel and the display apparatus provided by the embodiments of the present application, the display panel includes the light-emitting device layer, the touch control layer, the buffer layer, and the optical film layer. The light-emitting and display requirements can be satisfied through the sub-pixel units in the light-emitting device layer, and the arrangement of the touch control layer and the optical film layer can achieve the touch control function for the display panel. By adding the buffer layer between the optical film layer and the touch control layer and making the orthographic projection of the buffer layer on the base plate covers the orthographic projection of the light filtering units on the base plate, the buffer layer can separate the black matrices from the areas of the planarization layer corresponding to the various sub-pixels during the manufacturing of the optical film layer, thereby avoiding the direct contact between the black matrices and the areas of the planarization layer corresponding to the various sub-pixels. In addition, the material of the buffer layer and the material of the planarization layer are immiscible, it can be ensured that, when the black matrices of the optical film layer are patterned, the intermiscibility between the buffer layer and the black matrices is much lower than the intermiscibility between the planarization layer and the black matrices, so as to reduce or avoid the residue of the patterned black matrices in the areas corresponding to the various sub-pixel units, the light transmittance for the light emitted by the sub-pixel units and the light-emitting efficiency of the display panel are ensured, and the display effect is improved.

DETAILED DESCRIPTION

Features and exemplary embodiments of various aspects of the present application will be described in detail below. Moreover, features, structures, or characteristics described below can be combined in one or more embodiments in any suitable manner.

Color filter on encapsulation (COE) technology is the current mainstream for removing the polaroid, which utilizes the color film layer to replace the polarizer, therefore the thickness of the display panel is reduced by more than 100 um, the brightness is increased by 20%, and the utmost bending radius of the flexible screen is effectively reduced.

However, the COE technology has inherent defects. Since the color film layer is directly manufactured on the touch control layer, the matching of the current materials is not good, and the color film layer and the touch control layer are miscible. During the manufacturing of the color film layer, a black matrix layer is first formed on the touch control layer, then the black matrices are patterned, for example, the areas corresponding to the sub-pixel units in the touch control layer are removed by exposure and development, and then the light filtering units are formed at the positions corresponding to the various sub-pixel units, so as to achieve the light filtering function. In the existing display panel, when the patterning of the black matrices of the color film layer removes the areas corresponding to the sub-pixel units, the black matrices and the planarization layer of the touch control layer are miscible, therefore a portion of the black matrices are left on the touch control layer, especially in the areas corresponding to the sub-pixel units. The residue of the black matrices will affect the light transmittance for the light emitted by the sub-pixel units and the light-emitting efficiency of the display panel.

Therefore, in order to solve the above technical problems, the embodiments of the present application provide a display panel and a display apparatus, in which the display panel can satisfy the display requirement and effectively reduce the residue of the portions of the color film layer to be removed on the touch control layer, the light-emitting efficiency of the display panel is ensured.

For a better understanding of the present application, the display panel and the display apparatus according to the embodiments of the present application are described in detail below with reference to FIGS. 1 to 6.

Figure 1:
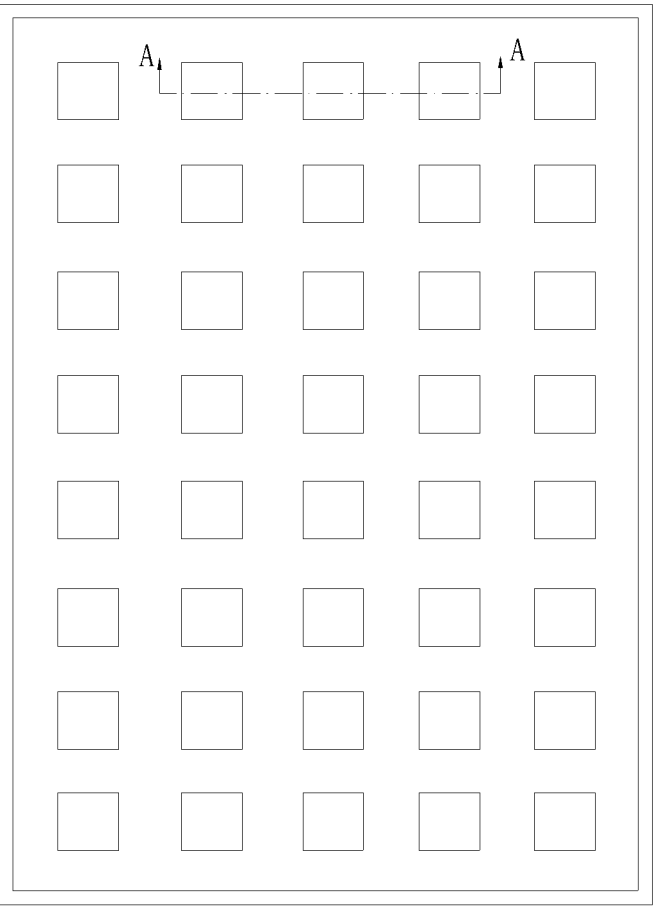
FIG. 1 shows a schematic structural diagram of a display panel according to one embodiment of the present application.
Figures 2, 3:
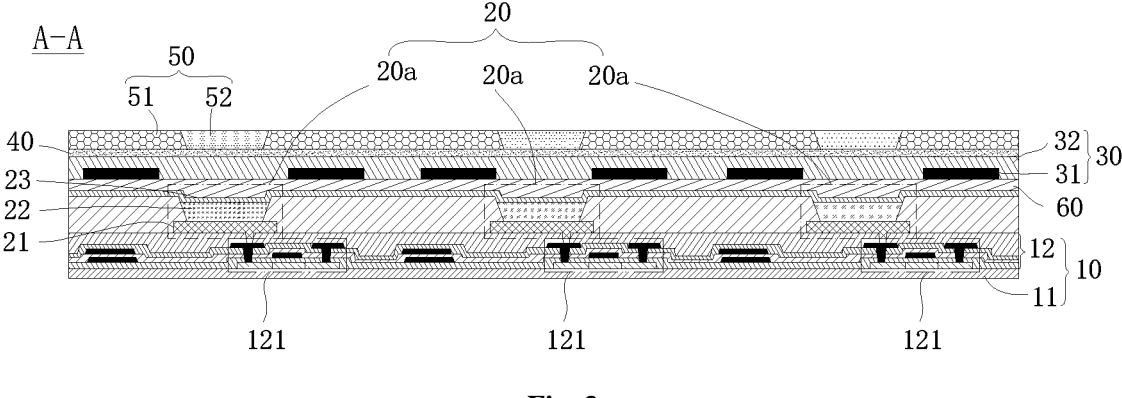
FIG. 2 shows a cross-sectional view along direction A-A in FIG. 1.
FIG. 3 shows a schematic cross-sectional view of a display panel according to another embodiment of the present application.

Referring to FIGS. 1 and 2, the display panel according to the embodiments of the present application includes a light-emitting device layer, a touch control layer 30, a buffer layer 40, and an optical film layer 50. The light-emitting device layer includes a base plate 10 and a light-emitting layer 20 arranged in stack, and the light-emitting layer 20 includes a plurality of sub-pixel units 20a distributed in an array. The touch control layer 30 is arranged at a side of the light-emitting layer 20 away from the base plate 10 and includes one or more touch control electrodes 31 and a planarization layer 32 covering the touch control electrodes 31. The buffer layer 40 is arranged at a side of the planarization layer 32 away from the light-emitting device layer. The optical film layer 50 is arranged at a side of the buffer layer 40 away from the touch control layer 30 and includes a plurality of black matrices 51 and a plurality of light filtering units 52 arranged in the same layer as the black matrices 51, and the plurality of light filtering units 52 are arranged in one-to-one correspondence with the plurality of sub-pixel units 20a. Herein, a material of the buffer layer 40 and a material of the planarization layer 32 are immiscible, and an orthographic projection of the buffer layer 40 on the base plate 10 covers an orthographic projection of the light filtering units 52 on the base plate 10.

According to the display panel provided by the embodiments of the present application, the light-emitting and display requirements can be satisfied through the sub-pixel units 20a in the light-emitting device layer, and the arrangement of the touch control layer 30 and the optical film layer 50 can achieve the touch control function for the display panel. By adding the buffer layer 40 between the optical film layer 50 and the touch control layer 30 and making the orthographic projection of the buffer layer 40 on the base plate 10 covers the orthographic projection of the light filtering units 52 on the base plate 10, the buffer layer 40 can separate the black matrices 51 from the areas of the planarization layer 32 corresponding to the various sub-pixels during the manufacturing of the optical film layer 50, thereby avoiding the direct contact between the black matrices 51 and the areas of the planarization layer 32 corresponding to the various sub-pixels. In addition, the material of the buffer layer 40 and the material of the planarization layer 32 are immiscible, it can be ensured that, when the black matrices 51 of the optical film layer 50 are patterned, the intermiscibility between the buffer layer 40 and the black matrices 51 is much lower than the intermiscibility between the planarization layer 32 and the black matrices 51, so as to reduce or avoid the residue of the patterned black matrices 51 in the areas corresponding to the various sub-pixel units 20a, the light transmittance for the light emitted by the sub-pixel units 20a and the light-emitting efficiency of the display panel are ensured, and the display effect is improved.

Optionally, the base plate 10 may include a substrate 11 and a device layer 12, and the substrate 11 may be a rigid substrate, or a flexible substrate with a certain bendability, which is beneficial to form a curved display screen. Optionally, the device layer 12 includes a plurality of pixel driving circuits 121 distributed in an array, and each of the pixel driving circuits 121 is electrically connected with at least one of the sub-pixel units 20a, so as to control the lighting time, brightness and the like of the sub-pixel units 20a.

Optionally, the light-emitting layer 20 is arranged at a side of the device layer 12 away from the substrate 11, and the number and pixel arrangement manner of the sub-pixel units 20a in the light-emitting layer 20 are not specifically limited, as long as the display requirement of the display panel can be satisfied.

Optionally, the plurality of sub-pixel units 20a in the light-emitting layer 20 may include red sub-pixel units, green sub-pixel units, and blue sub-pixel units.

Referring to FIGS. 2 to 6, optionally, each of the sub-pixel units 20a may include an anode 21, a light-emitting element 22, and a cathode 23, the light-emitting element 22 is located between the anode 21 and the cathode 23, the anode 21 faces the substrate 11 and is electrically connected with the pixel driving circuit 121, and the cathode 23 is arranged at a side of the light-emitting element 22 away from the anode 21.

Optionally, the cathodes 23 of the various sub-pixel units 20a may be arranged independently, and in some embodiments, the cathodes 23 of the various sub-pixel units 20a may be connected with each other to form an integrate surface electrode.

Optionally, the touch control layer 30 includes a plurality of touch control electrodes 31 which may be formed in a same metal layer or two or more metal layers, and in the later case, an insulating layer may be arranged between adjacent metal layers. Optionally, the touch control manner adopted by the touch control layer 30 may be a self-capacitive manner or a mutual capacitive manner. The touch control electrodes 31 may include touch control driving electrodes and touch control sensing electrodes which may be formed in a same metal layer, the adjacent touch control sensing electrodes may be electrically connected via a bridge formed in another metal layer, and the corresponding touch control driving electrodes may also be electrically connected via a bridge formed in another metal layer. In some embodiments, the touch control driving electrodes and the touch control sensing electrodes may be formed in different metal layers, which is not specifically limited herein.

Optionally, the buffer layer 40 may be arranged in stack with, as well as contact and connect, the planarization layer 32 of the touch control layer 30. The material of the buffer layer 40 and the material of the planarization layer 32 being immiscible may specifically mean that, after the black matrices 51 in the optical film layer 50 are patterned, the buffer layer 40 and the planarization layer 32 are not miscible or less miscible, so that the intermiscibility between the buffer layer 40 and the black matrices 51 is lower than the intermiscibility between the planarization layer 32 and the black matrices 51.

As an optional implementation, the buffer layer 40 may be an inorganic material layer, and the planarization layer 32 may be an organic material layer. Since the planarization layer 32 needs to protect the touch control electrodes 31 while achieving the planarization, the planarization layer 32 usually adopts an organic adhesive layer, and the black matrices 51 in the optical film layer 50 are usually made of organic material, the intermiscibility between the planarization layer 32 and the black matrices 51 is high. The buffer layer 40 is an inorganic material layer which is of opposite polarity, and less miscible, with the material of the black matrices 51, therefore the black matrices 51 are not tend to remain on the buffer layer 40 during the exposure and development for patterning, and the light-emitting efficiency of the display panel is ensured.

In some optional embodiments, the buffer layer 40 may be made of inorganic materials such as silicon oxide, silicon nitride, and transparent ITO.

As an optional implementation, the orthographic projection of the buffer layer 40 on the base plate 10 may only cover the orthographic projection of the light filtering units 52 on the base plate 10, while in some embodiments, the orthographic projection of the buffer layer 40 on the base plate 10 may further cover the orthographic projection of the black matrices 51 on the base plate 10.

As an optional implementation, in the display panel according to the embodiments of the present application, the buffer layer 40 may be an integrated layer, so that the orthographic projection of the buffer layer 40 on the base plate 10 covers both the orthographic projection of the black matrices 51 and the orthographic projection of the light filtering units 52. The buffer layer 40 completely isolates the black matrices 51 from the planarization layer 32, thereby avoiding the direct contact between the black matrices 51 and the planarization layer 32, and effectively avoiding the intermiscibility between the black matrices 51 and the planarization layer 32 during the patterning.

In some optional embodiments, if the buffer layer 40 is an integrated layer, the buffer layer 40 may be entirely of a uniform thickness. With the above arrangement, the direct contact between the black matrices 51 and the planarization layer 32 can be effectively avoided, and in turn the intermiscibility between the black matrices 51 and the planarization layer 32 during the patterning can be avoided, which is beneficial to the manufacturing of the buffer layer 40.

Referring to FIG. 3, in some optional embodiments, in the display panel according to the embodiments of the present application, the buffer layer 40 incudes a plurality of accommodating slots 40a, and the black matrix 51 is at least partially located within the accommodating slot 40a and abuts against an inner wall surface of the accommodating slot 40a. With the above arrangement, the adhesion area between the black matrix 51 and other layer structures is increased, the connection strength between the layer structures is ensured, and the peeling of the black matrix 51 is avoided. In the implementation, a thickness of an area of the buffer layer 40 corresponding to the black matrix 51 is less than a thickness of an area of the buffer layer 40 corresponding to the light filtering unit 52.

As an optional implementation, the buffer layer 40 is arranged as an integrated layer and sandwiched between the touch control layer and the optical film layer, and a thickness of an area of the buffer layer 40 corresponding to the black matrix 51 is less than a thickness of an area of the buffer layer 40 corresponding to the light filtering unit 52. That is, the depth of the accommodating slot 40a may be less than the thickness of the buffer layer 40, and the buffer layer 40 may completely isolate the black matrices 51 from the planarization layer 32, so that the surface facing the light-emitting device layer and the sidewall surface of the black matrix 51 all contact and connect the buffer layer 40.

The depth of the accommodating slot 40a being less than the thickness of the buffer layer 40 is only an optional implementation, but the present application is not such limited, in some other embodiments, the depth of the accommodating slot 40a may be equal to the thickness of the buffer layer 40, that is, the accommodating slot 40a is arranged through the buffer layer 40.

Figure 4:
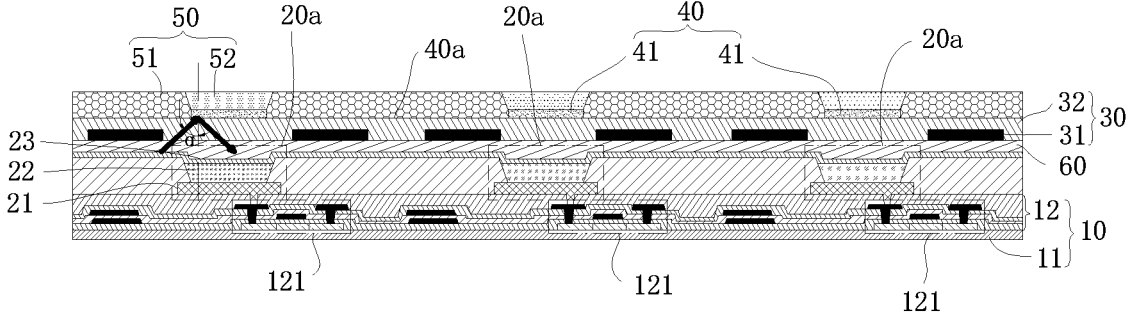
FIG. 4 shows a schematic cross-sectional view of a display panel according to yet another embodiment of the present application.

Referring to FIG. 4, in some optional examples, the buffer layer 40 incudes a plurality of buffer units 41 distributed in an array, the accommodating slot 40a is formed between adjacent two buffer units 41, each buffer unit 41 is arranged corresponding to one light filtering unit 52 and covers a surface facing the light-emitting device layer of the light filtering unit 52, and the black matrix 51 is at least partially located within the accommodating slot 40a enclosed by the planarization layer 32 and the buffer layer 40 and abuts against a wall surface of the accommodating slot 40a.

As an optional implementation, the plurality of light filtering units 52 may include red light filtering units, green light filtering units, and blue light filtering units, in which each red light filtering unit is arranged corresponding to one red sub-pixel unit, each green light filtering unit is arranged corresponding to one green sub-pixel unit, and each blue light filtering unit is arranged corresponding to one blue sub-pixel unit. The light filtering requirement can be satisfied, and the light-emitting efficiency of the display panel can also be ensured.

In some optional embodiments, in the display panel according to the above embodiments of the present application, a refractive index of the buffer layer 40 is less than a refractive index of the planarization layer 32.

The cathode 23 of each sub-pixel unit 20a in the light-emitting layer 20 is made of a metallic material, and the area is large. When external light enters the display panel, the light will be reflected at the cathode 23, and the reflected light will enter the human eye. Moreover, after the polarizer is removed, the increase of the light transmittance for the light emitted by the light-emitting layer 20 will increase the reflection of the cathode 23, the brightness enhancement resulting from removing the polarizer is weakened, and the brightness enhancement of the display panel is affected, which is not beneficial to the user experience.

In the display panel according to the embodiments of the present application, the refractive index of the buffer layer 40 is less than the refractive index of the planarization layer 32, when light is directed from an optically denser medium into an optically thinner medium, the total reflection effect will occur if the angle of incidence satisfies certain conditions. The critical angle $\alpha$ satisfies the following equation (1):

$$\alpha = \arcsin(n1/n2) \tag{1}$$

in which n1 is the refractive index of the optically thinner medium, and n2 is the refractive index of the optically denser medium.

As a result, all of the light reflected by the cathode 23 with an angle of incidence greater than the critical angle will be fully reflected back into the interior of the screen, the reflected light received by the human eye is reduced and the brightness of the screen is improved. The sub-pixel unit 20a emits direct light with an angle of incidence of 90 degrees, the total reflection effect will not occur, therefore no light loss is caused.

In the embodiment, for example, the buffer layer 40 is silicon oxide, and the planarization layer 32 is an organic adhesive or OC adhesive. The refractive index of the planarization layer 32 is 1.6, the refractive index of the buffer layer 40 is 1.4, and the critical angle α is:

$$\alpha=\arcsin(1.45/1.6)=65°$$

It can be seen that the light reflected by the cathode 23 with an angle of incidence greater than 65° will be fully reflected. Theoretically, 25% of the reflected light will be shielded, and the brightness is significantly improved.

Figure 5:
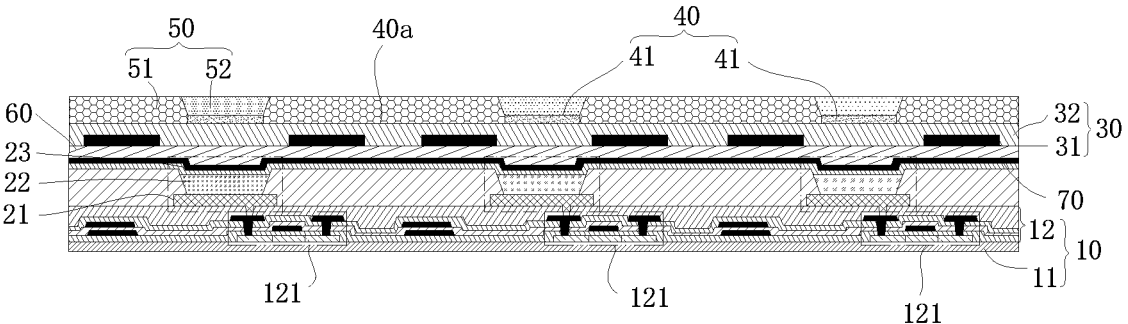
FIG. 5 shows a schematic cross-sectional view of a display panel according to yet another embodiment of the present application.
Figure 6:
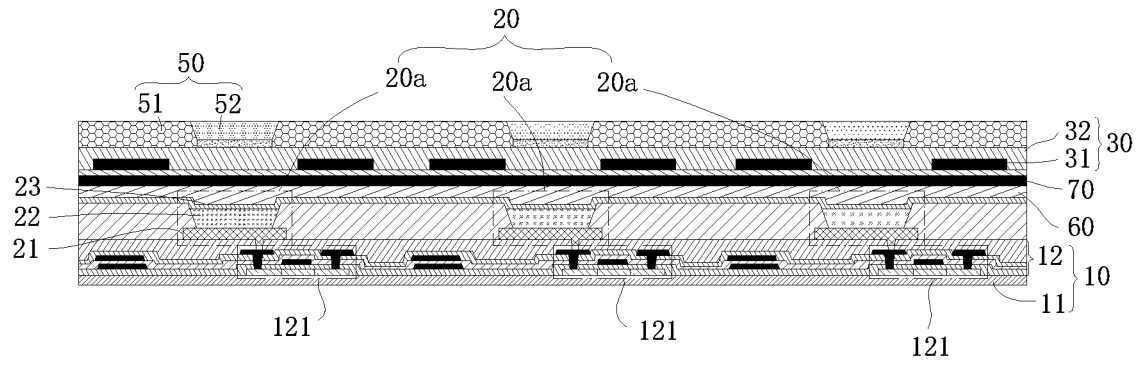
FIG. 6 shows a schematic cross-sectional view of a display panel according to yet another embodiment of the present application.

Referring to FIGS. 5 and 6, in the display panel according to the above embodiments of the present application, only as an optional implementation, the reflection of the cathode 23 is solved by setting that the refractive index of the buffer layer 40 is less than the refractive index of the planarization layer 32, and in some other embodiments, the display panel may further include a reflective layer 70 located between the planarization layer 32 and the light-emitting layer 20, and the reflective layer 70 is capable of re-reflecting at least a portion of light reflected from the light-emitting device layer towards a light-emitting surface side of the display panel towards a side where the light-emitting device layer is located.

By adding the reflective layer 70, after the light from the outside is reflected at the cathode 23, the reflected light will act on the reflective layer 70, and at least a portion of the reflected light will be re-reflected by the reflective layer 70 towards the side where the light-emitting device layer is located, so as to reduce the influence of the reflection and ensure the display effect of the display panel.

As an optional implementation, in the display panel according to the embodiments of the present application, if the display panel includes the reflective layer 70, the reflective layer 70 may be arranged anywhere at a side of the light-emitting device layer away from the base plate 10, that is, the reflective layer 70 may be arranged between the cathode 23 and the human eye, so as to ensure that the external light reflected from the cathode 23 is re-reflected towards the side where the light-emitting device layer is located.

As shown in FIG. 5, in some optional embodiments, in the display panel according to the embodiments of the present application, if the reflective layer 70 is included, the reflective layer 70 may be located between the light-emitting device layer and the touch control layer 30 and arranged in stack with the cathodes 23.

The arrangement of the reflective layer 70 between the light-emitting device layer and the touch control layer 30 and in stack with the cathodes 23 is only an optional implementation, but the present application is not such limited.

As shown in FIGS. 2-4 and 6, the display panel further includes an encapsulation layer 60 located between the touch control layer 30 and the base plate 10. As shown in FIGS. 2-4, the encapsulation layer 60 is arranged at a side of the touch control layer 30 close to the base plate 10. As shown in FIG. 6, the encapsulation layer 60 is arranged at a side of the reflective layer 70 close to the base plate 10, and with this arrangement, the influence of the reflection can also be reduced.

In another aspect, the embodiments of the present application further provide a display apparatus including the display panel as described above. The display apparatus may be any product or component with a display function such as a cell phone, a tablet computer, a laptop computer, a digital photo frame, and a navigator.

The display apparatus according to the embodiments of the present application includes the display panel according to the above embodiments, the light-emitting and display requirements can be satisfied through the sub-pixel units 20*a* in the light-emitting device layer, and the arrangement of the touch control layer 30 and the optical film layer 50 can achieve the touch control function for the display panel. By adding the buffer layer 40 between the optical film layer 50 and the touch control layer 30 and making the orthographic projection of the buffer layer 40 on the base plate 10 covers the orthographic projection of the light filtering units 52 on the base plate 10, the buffer layer 40 can separate the black matrices 51 from the areas of the planarization layer 32 corresponding to the various sub-pixels during the manufacturing of the optical film layer 50, thereby avoiding the direct contact between the black matrices 51 and the areas of the planarization layer 32 corresponding to the various sub-pixels. In addition, the level of resistance to chemical attack of the buffer layer 40 is higher than the level of resistance to chemical attack of the planarization layer 32, it can be ensured that, when the black matrices 51 of the optical film layer 50 are patterned, the intermiscibility between the buffer layer 40 and the black matrices 51 is much lower than the intermiscibility between the planarization layer 32 and the black matrices 51, so as to reduce or avoid the residue of the patterned black matrices 51 in the areas corresponding to the various sub-pixel units 20*a*, the light transmittance for the light emitted by the sub-pixel units 20*a* and the light-emitting efficiency of the display apparatus are ensured, and the display effect is improved.

Although the present application has been described with reference to the preferred embodiments, various improvements can be made and the components therein can be replaced with equivalents without departing from the scope of the present application. In particular, as long as there is no structural conflict, the various technical features described in the various embodiments can be combined in any manner. The present application is not limited to the particular embodiments disclosed herein, but includes all technical solutions falling within the scope of the claims.

What is claimed is:

1. A display panel comprising:

a light-emitting device layer comprising a base plate and a light-emitting layer arranged in stack, the light-emitting layer comprising a plurality of sub-pixel units distributed in an array;

a touch control layer arranged at a side of the light-emitting layer away from the base plate and comprising one or more touch control electrodes and a planarization layer covering the one or more touch control electrodes;

a buffer layer arranged at a side of the planarization layer away from the light-emitting device layer; and an optical film layer arranged at a side of the buffer layer away from the touch control layer and comprising a plurality of black matrices and a plurality of light filtering units, wherein the plurality of light filtering units is arranged in one-to-one correspondence with the plurality of sub-pixel units, a material of the buffer layer and a material of the planarization layer are immiscible, an orthographic projection of the buffer layer on the base plate covers an orthographic projection of the plurality of light filtering units on the base plate, the planarization layer, the buffer layer, and the plurality of light filtering units are stacked in sequence and in surface contact, the plurality of black matrices is located on a surface of the planarization layer or the buffer layer, and intermiscibility between the buffer layer and the plurality of black matrices is lower than intermiscibility between the planarization layer and the plurality of black matrices.

2. The display panel of claim 1, wherein the orthographic projection of the buffer layer on the base plate further covers an orthographic projection of the plurality of black matrices on the base plate.

3. The display panel of claim 2, wherein the buffer layer is arranged as an integrated layer of a uniform thickness, the plurality of black matrices and the plurality of light filtering units are both located on an upper surface of the buffer layer.

4. The display panel of claim 1, wherein the buffer layer further comprises:
a plurality of accommodating slots, and the plurality of black matrices is at least partially located within the plurality of accommodating slots and abuts against an inner wall surface of the plurality of accommodating slots.

5. The display panel of claim 4, wherein the buffer layer further comprises:
a plurality of buffer units distributed in an array, the plurality of accommodating slots is enclosed by the planarization layer and the plurality of buffer units, each accommodating slot is located between two adjacent buffer units, the plurality of buffer units is arranged in one-to-one correspondence with the plurality of light filtering units, and each buffer unit covers a surface facing the light-emitting device layer of the light filtering unit corresponding to the respective buffer unit.

6. The display panel of claim 4, wherein a depth of the plurality of accommodating slots is equal to a thickness of the buffer layer, the plurality of accommodating slots passes through the buffer layer, and the plurality of black matrices is located on an upper surface of the planarization layer.

7. The display panel of claim 4, wherein the buffer layer is arranged as an integrated layer and sandwiched between the touch control layer and the optical film layer, a thickness of an area of the buffer layer corresponding to the plurality of black matrices is less than a thickness of an area of the buffer layer corresponding to the light filtering unit, and the plurality of black matrices and the light filtering units are both located on an upper surface of the buffer layer.

8. The display panel of claim 1, wherein the buffer layer is an inorganic material layer, the planarization layer is an organic material layer, and a material of the plurality of black matrices is an organic material.

9. The display panel of claim 8, wherein the buffer layer comprises at least one of silicon oxide, silicon nitride, and transparent indium tin oxide.

10. The display panel of claim 1, wherein a refractive index of the buffer layer is less than a refractive index of the planarization layer.

11. The display panel of claim 1, wherein the display panel further comprises:
a reflective layer located between the planarization layer and the light-emitting layer, and the reflective layer is configured to re-reflect at least a portion of light reflected from the light-emitting device layer toward a light-emitting surface side where the light-emitting device layer is located.

12. The display panel of claim 11, wherein each sub-pixel unit of the plurality of sub-pixel units further comprises:
an anode,
a light-emitting element, and
a cathode, and an orthographic projection of the reflective layer on the base plate covers cathodes of the plurality of sub-pixel units.

13. The display panel of claim 12, wherein the reflective layer is located between the light-emitting device layer and the touch control layer and arranged in a stack with the cathodes.

14. The display panel of claim 11, further comprising:
an encapsulation layer located between the touch control layer and the base plate and arranged at a side of the reflective layer close to the base plate.

15. The display panel of claim 1, wherein the base plate further comprises:
a substrate; and
a device layer comprising a plurality of pixel driving circuits distributed in an array, and each pixel driving circuit of the plurality of pixel driving circuits is electrically connected with at least one sub-pixel unit of the plurality of sub-pixel units.

16. A display apparatus, comprising the display panel of claim 1.

17. The display panel of claim 1, wherein the buffer layer completely isolates the plurality of black matrices from the planarization layer.

* * * * *